(12) United States Patent
Sangha et al.

(10) Patent No.: US 12,706,554 B2
(45) Date of Patent: Aug. 11, 2026

(54) CONTROLLER FOR AN AIRCRAFT ASSEMBLY

(71) Applicant: Hamilton Sundstrand Corporation, Charlotte, NC (US)

(72) Inventors: Parminder Sangha, Solihull (GB); Andrew Mclean, Halesowen (GB)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 162 days.

(21) Appl. No.: 18/608,403

(22) Filed: Mar. 18, 2024

(65) Prior Publication Data

US 2024/0313672 A1 Sep. 19, 2024

(30) Foreign Application Priority Data

Mar. 17, 2023 (EP) .................................... 23162709

(51) Int. Cl.
*H02P 3/14* (2006.01)
*H02P 3/22* (2006.01)

(52) U.S. Cl.
CPC .................................... *H02P 3/22* (2013.01)

(58) Field of Classification Search
CPC ...... H02P 3/00; H02P 3/14; H02P 3/18; H02P 3/22; H02P 6/24
USPC ........................................................ 318/375
See application file for complete search history.

(56) References Cited

U.S. PATENT DOCUMENTS 5,512,811 A * 4/1996 Latos ....................... H02P 9/08 322/29
10,965,227 B2 3/2021 Benarous
2005/0200328 A1* 9/2005 Edson .................. G05B 19/404 318/611
2006/0175996 A1* 8/2006 Tether ....................... B60L 7/10 318/376
2007/0018597 A1* 1/2007 Schlehaus .............. H02M 1/42 318/437
2017/0253344 A1* 9/2017 Wangemann ........... B60L 15/32
2022/0200503 A1* 6/2022 Popek ..................... B64C 13/50
2023/0033229 A1* 2/2023 Wu ......................... B60L 15/20

FOREIGN PATENT DOCUMENTS

CA 3052344 A1 2/2020
CN 103414180 B 8/2015
CN 109728735 A 5/2019
(Continued)

OTHER PUBLICATIONS

Abstract for CN109728735 (A), Published: May 7, 2019, 1 page.
(Continued)

*Primary Examiner* — Gabriel Agared
(74) *Attorney, Agent, or Firm* — CANTOR COLBURN LLP

(57) ABSTRACT

A controller for an aircraft assembly. The aircraft assembly includes a permanent magnet motor. The controller is configured to control the permanent magnet motor according to a damping mode. In the damping mode the controller receives electrical energy from the permanent magnet motor, wherein the electrical energy is produced as a result of kinetic energy in the aircraft assembly. The controller uses the electrical energy to send a first signal to control a transfer of electrical energy from the permanent magnet motor to a damping component to provide damping to the permanent magnet motor.

18 Claims, 2 Drawing Sheets

(56) References Cited

FOREIGN PATENT DOCUMENTS

| | | | |
|---|---|---|---|
| CN | 112054719 | A | 12/2020 |
| EP | 4020789 | A1 | 6/2022 |
| WO | 8908946 | A1 | 9/1989 |

OTHER PUBLICATIONS

Abstract of CN103414180 (B), Published: Aug. 26, 2015, 1 page.
Abstract of CN112054719 (A), Published: Dec. 8, 2020, 1 page.
European Search Report for Application No. 23162709.2, mailed Sep. 1, 2023, 7 pages.

* cited by examiner

CONTROLLER FOR AN AIRCRAFT ASSEMBLY

CROSS REFERENCE TO RELATED APPLICATIONS

This application claims priority to European Patent Application No. 23162709.2 filed Mar. 17, 2023, the entire contents of which is incorporated herein by reference.

FIELD OF THE INVENTION

This application relates to a controller for controlling a permanent magnet motor.

BACKGROUND

A permanent magnet motor (PMM) is useful for motion control of an aircraft component. An aircraft assembly comprising the motor and aircraft component may gain kinetic energy. In order to prevent damage to the aircraft assembly, particularly during a power failure event, a damping function is required to limit the rate of deceleration as the motor approaches a limit stop. The damping is typically achieved by passive magnetic damping or electromagnetic damping. Systems utilising passive magnetic damping suffer from additional losses introduced by the damping function, resulting in an overall reduction in motor drive efficiency. Alternatively, systems utilising electromagnetic damping require a permanent input voltage supply to power the damping control functions, leaving the damping function inoperable during input voltage interrupts. There thus remains scope for providing improvements to PMM damping.

SUMMARY

In a first aspect there is provided a controller for an aircraft assembly. The aircraft assembly comprises a permanent magnet motor. The controller is configured to control the permanent magnet motor according to a damping mode. In the damping mode the controller receives electrical energy from the permanent magnet motor, wherein the electrical energy is produced as a result of kinetic energy in the aircraft assembly; and uses the electrical energy to send a first signal to control a transfer of electrical energy from the permanent magnet motor to a damping component to provide damping to the permanent magnet motor.

Because the controller receives energy from the motor during the damping mode, the controller is able to provide a signal (power) that can be used to activate damping components. This allows the controller to reliably configure the circuit into the damping mode, even in the absence of a system input power supply.

Because the signal from the controller can be used to, for example, activate damping components, this further allows for the use of damping components which have an inactive configuration when not powered. As a result, the controller or associated damping components advantageously do not consume energy during normal (non-damping) operation. This can improve the efficiency of a motor drive system during a motoring mode, whilst enabling an effective level of damping during a damping mode.

In some examples the controller is further configured to monitor a power line used for powering the motor by sensing a voltage, a current and/or a power level on the power line to produce data; and determine a state of the power line based on the data. By knowing the state of the power line which powers the PMM, the controller can provide a dynamic level of damping.

In some examples the controller receives a command to initiate the damping mode.

In some examples the controller generates a command to initiate the damping mode.

In some examples the controller generates the command to initiate the damping mode by using the data.

In some examples the motor receives electrical power from a circuit; and in the damping mode the controller provides the first signal to a first switch in order to connect or disconnect a part of the circuit. Providing a signal to a switch in order to connect or disconnect a part of the circuit is an effective way of activating damping components which may, for example, be in series with the switch.

In some examples the power to operate the first switch is provided only by the power from the controller. Because all of the power needed to operate the switch is provided by the controller, there is no need for an external power source.

In some examples the electrical energy received by the controller has been rectified by an inverter. Because an inverter is a common component in driving a PMM, for example in an DC-AC inverter circuit, the inverter which is already in situ can be utilised to provide rectified power to the controller, which will provide stable power for the controller.

In some examples the electrical energy received by the controller is rectified by the controller. In some scenarios it may be beneficial to connect the controller directly to the PMM, in which case there may be a need to rectify power received from the PMM within the inverter.

In some examples the first switch is a Normally Open switch; and the first signal configures the first switch into a closed configuration which connects the damping component to the circuit, such that electrical energy can be transferred from the permanent magnet motor to the damping component. By using a (dedicated) damping component, the level of damping provided can be controlled and designed in accordance with the requirements or specification of the PMM. A damping component can thus be designed to provide a level of damping which may be required to meet, for example, a regulatory requirement.

In some examples the first signal is a Pulse Width Modulated signal.

In some examples the first switch is in the closed configuration for a period of time corresponding to a parameter of the PWM signal, such that the average power transferred to the damping component is proportional to the parameter of the PWM signal.

In some examples the parameter is a pulse width, a duty cycle and/or a frequency of the PWM signal.

By using a PWM signal, power will only be transferred to the damping component for a period of time proportional to the parameter of the PWM signal. As a result, the damping component can be configured, in real time, by adjusting PWM parameters, which enables the damping component to offer a variable level of damping.

In some examples the controller further comprises a brake controller. The brake controller is configured to implement a braking algorithm; wherein the braking algorithm configures one or more of the parameters of the PWM signal based on the data. Because the data is an indication of the state of the power line, the braking algorithm can be used to determine a level of damping required for a particular state of the power line. As a result, the damping effectiveness can be optimised in real time.

In some examples the braking algorithm configures the PWM signal by increasing the pulse width or duty cycle of the PWM signal as the voltage, current and/or power level on the power line increases.

In some examples the braking algorithm configures the PWM signal by decreasing the pulse width or duty cycle of the PWM signal as the voltage, current and/or power level on the power line decreases.

In some examples the controller is further configured to provide a second signal to a second switch, wherein the second signal configures the second switch to connect or disconnect the damping component from the circuit. A second switch is an effective way of increasing the reliability of the disconnection of the damping component to the circuit, for example, in case the first switch fails.

In some examples the second switch is a Normally Open switch; and the power required to provide the second signal is provided to the controller by the motor. Because the second switch is normally open it does not require power during normal operation.

In some examples the second signal is provided by a source external to the controller. As a result, the second switch is able to disconnect the damping component even if the controller is inactive or faulty.

In some examples the damping component comprises a resistive load; and providing the first signal causes the transferred energy to be dissipated in the resistive load. A resistive load is an effective way of dissipating energy to provide damping. A resistive load, when connected to the circuit through a switch receiving a PWM signal, can effectively make a variable resistive load.

In some examples the damping component comprises an energy storage device; and providing the first signal causes the transferred energy to be stored in the energy storage device. By transferring the energy to an energy storage device, for example a capacitor, the energy can be recycled in a later stage. Recycling energy can improve the overall efficiency of a system.

In some examples the damping component further comprises a resistive load and a third switch; and the controller is further configured to, in response to the energy storage device reaching a charge threshold, provide a third signal to the third switch, wherein the third signal configures the third switch to connect the resistive load to the circuit, such that energy can be transferred to and then dissipated in the resistive load. By using both a resistive load and an energy storage device, an optimum level of energy recycling and damping can be achieved.

In a second aspect there is provided a DC-AC inverter circuit for damping a permanent magnet motor, the circuit comprising a damping component and a controller for controlling the circuit to provide the damping according to the first aspect.

In some examples the circuit comprises an inverter that includes freewheeling diodes, and the inverter is configured to convert electrical power received on a power line to output electrical power for the motor.

In some examples the circuit comprises a first switch.

In some examples the first switch is configured to connect or disconnect the damping component to the circuit.

In a third aspect there is provided an aircraft system comprising a permanent magnet motor; a power source for powering the permanent magnet motor; and the circuit of the second aspect.

In some examples the permanent magnet motor is for providing actuation to an aircraft landing gear system; an aircraft control surface; a flap; a spoiler; an aircraft door or evacuation system.

In a fourth aspect there is provided a method for controlling an aircraft assembly comprising a permanent magnet motor. The method comprises controlling the permanent magnet motor according to a damping mode. The damping mode comprises powering a controller by drawing electrical energy from the permanent magnet motor, wherein the electrical energy is produced as a result of kinetic energy in the aircraft assembly; and using the electrical energy to send a first signal to control a transfer of electrical energy from the permanent magnet motor to a damping component to provide damping to the permanent magnet motor.

The circuit of the second aspect and the aircraft system of the third aspect may each comprise any of the features of the examples described with respect to the first aspect. The method of the fourth aspect may include any functional steps described in relation to the examples of the first to third aspects.

BRIEF DESCRIPTION OF THE DRAWINGS

Various examples will now be described with reference to the accompanying drawings in which.

DETAILED DESCRIPTION

Figure 1:
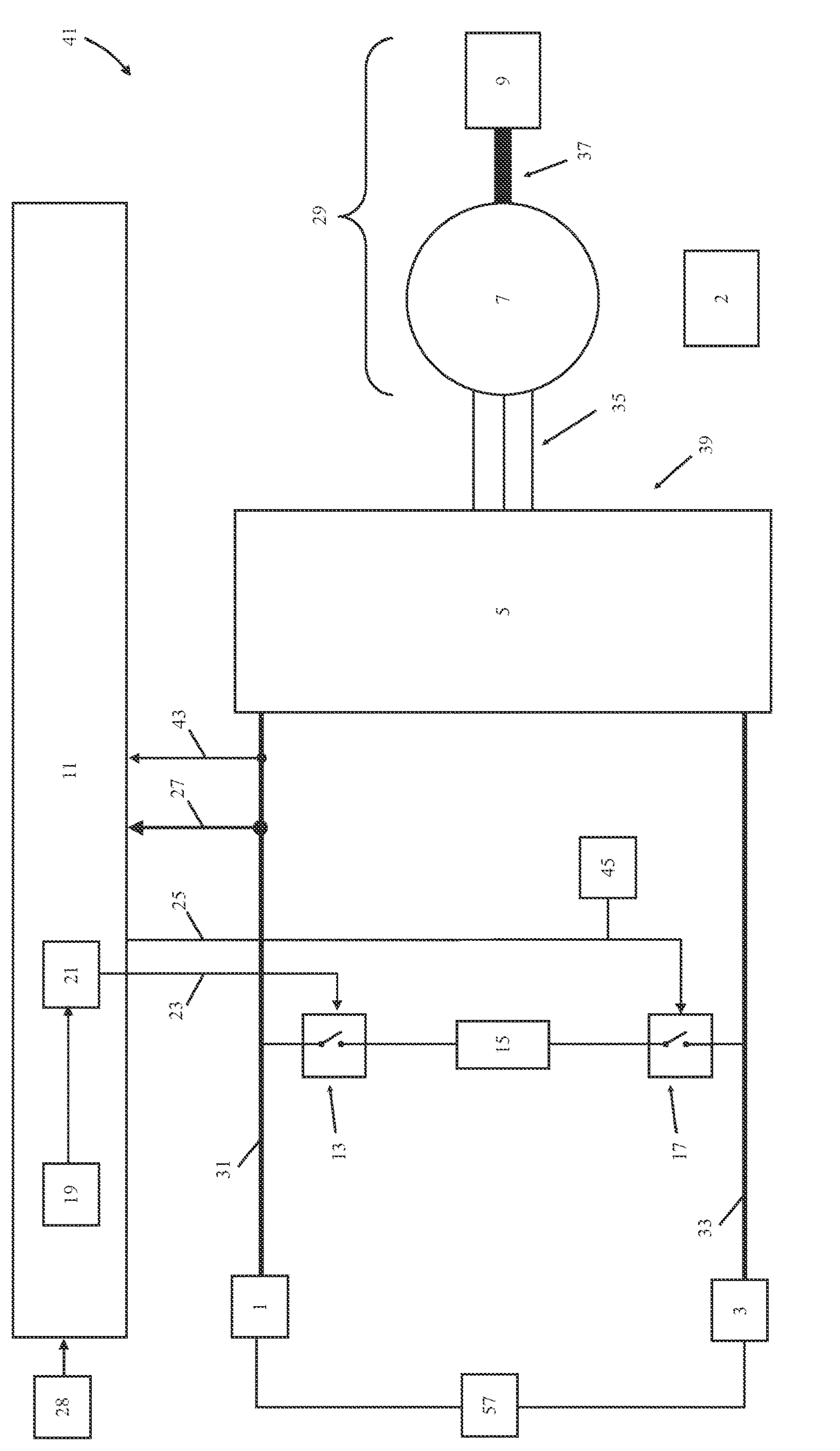
FIG. 1 shows a schematic diagram of an aircraft system comprising a controller, a high-level controller, an inverter circuit, a first damping component configuration, and an aircraft assembly.

With reference to FIG. 1, an aircraft system 41 comprises a direct current (DC) power source 57, a circuit 39, an aircraft assembly 29, a high-level controller 2 and a controller 11.

The aircraft assembly 29 comprises a Permanent Magnet Motor 7, a mechanical coupling 37 and an aircraft component 9.

The high-level controller 2 is for controlling the power source 57 and the circuit 39 during a motoring mode to achieve a desired mechanical torque output from the motor 7. The controller 11 is for controlling the circuit 39 and the motor 7 during a damping mode to achieve a desired level of damping. Each of these features are discussed further below. The high-level controller 2 and the controller 11 may be separate units, may be the same unit, or may be part of a larger controller unit.

The circuit 39 comprises power connection terminals 1, 3 which are connected to the power source 57. The connection terminal 1 is connected to a power line 31 for providing electrical power to the circuit 39. The connection terminal 3 is connected to a neutral (or return, common, ground etc.) line 33 for providing a return path to the power source 57. The power source 57 may be part of a larger aircraft electrical network (not shown).

The power line 31 and the neutral line 33 are connected to a DC-AC inverter 5. The DC-AC inverter 5 is connected to a 3-phase permanent magnet motor 7 via a 3-phase connection 35. Although in this example a 3-phase motor is disclosed, a single phase or multiphase motor could also be used for the motor 7.

The motor 7 is connected to an aircraft component 9 via a mechanical coupling 37. The mechanical coupling 37 transfers mechanical force or torque from the motor 7 to the aircraft component 9. The mechanical coupling 37 can also transfer mechanical force or torque from the aircraft component 9 to the motor 7.

The circuit 39 further comprises a first switch 13, a damping component 15, which in this example is a resistive load, and a second switch 17. In this example, the first switch 13 is a normally open switch, and the second switch 17 is a normally open switch. The resistive load 15 is a damping component for providing damping to the motor 7, as discussed further below. The first switch 13, the resistive load 15, and the second switch 17 are connected in series and thus form an electrical branch. The electrical branch is connected between the power line 31 and the neutral line 33 in parallel with the inverter.

The controller 11 is connected to the circuit 39. The controller 11 is connected to the circuit 39 via a first connection 27 which connects the power line 31 to the controller 11. The first connection 27 is designed and configured to transfer electrical power.

The controller 11 may additionally or alternatively be connected to the motor 7 via a second connection which connects one or more phases of the motor 7 to the controller 11.

The controller 11 is further connected to the circuit 39 via a monitoring line 43, a first signal line 23 and a second signal line 25. The controller 11 also comprises a brake controller 21.

The monitoring line 43 connects the power line 31 to the controller 11 and is used by the controller 11 to monitor electrical parameters such as voltage, current and/or power to produce data 19. The data 19 is used for control purposes.

The first signal line 23 connects the controller 11 to the first switch 13, and is used by the controller 11 to control the first switch 13. In particular, the brake controller 21 of the controller 11 uses the data 19 to determine the control signal to supply to the first switch 13, as discussed further below.

The second signal line 25 connects the controller 11 to the second switch 17. The second signal line 25 also connects the switch 17 to an external controller 45. The external controller 45 may be part of the aircraft electrical network. The second signal line 25 is used by the controller 11 or the external controller 45 to control the second switch 17.

Figure 2:
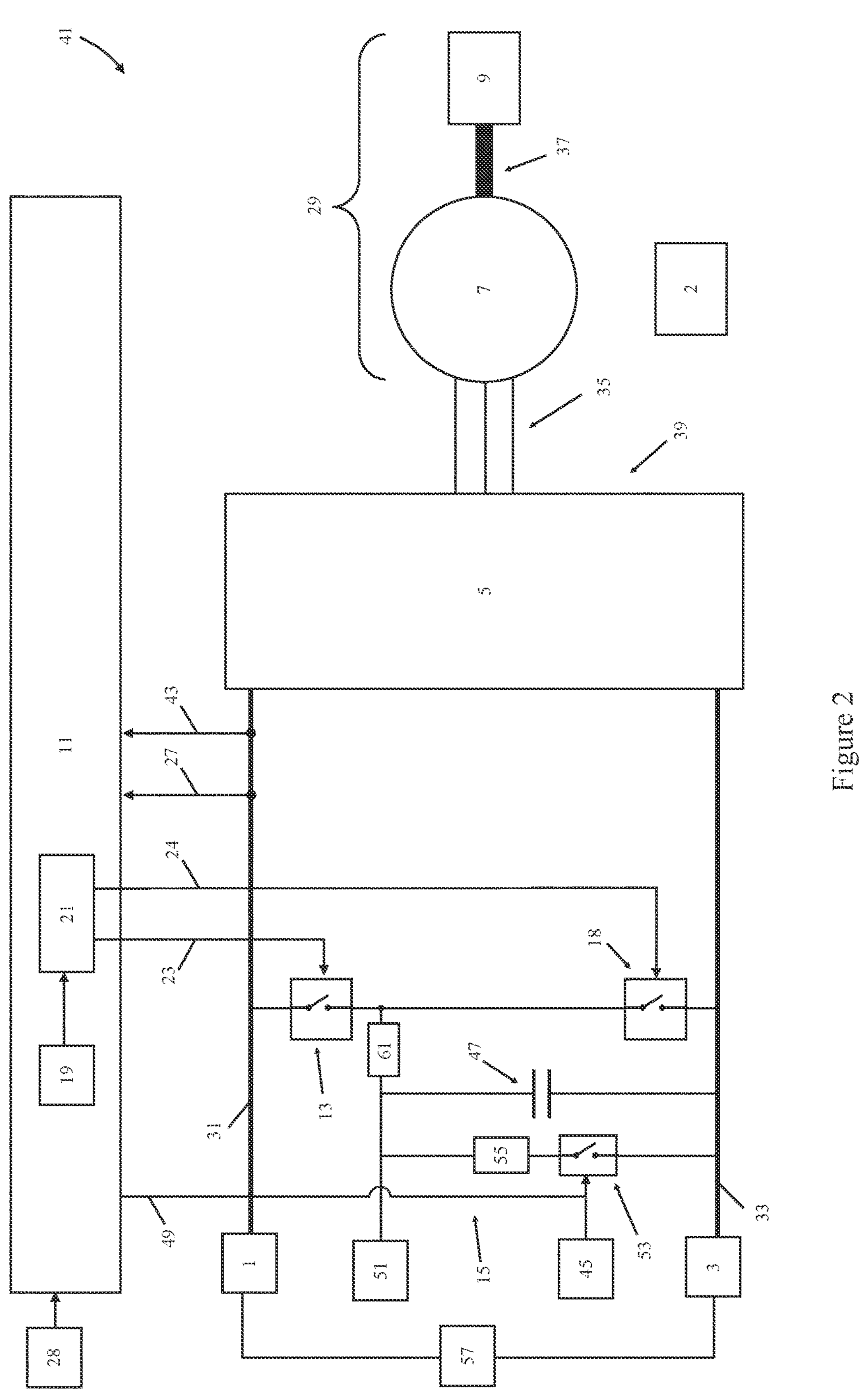
FIG. 2 shows a schematic diagram of an aircraft system comprising a controller, a high-level controller, an inverter circuit, a second damping component configuration, and an aircraft assembly.

FIG. 2 shows an example in which like reference numerals denote similar features to those described in relation to FIG. 1, therefore a repeated description is omitted.

In the example shown in FIG. 2 the damping component 15 comprises an energy storage device 47, a resistive load 55, an inductor 61 and a third switch 53. Furthermore, this example includes a fourth switch 18 which is controlled via a fourth signal line 24, and the second switch 17 is not included. It is to be understood that various combinations of a resistive load and an energy storage device are possible, and the example shown in FIG. 2 is an example.

The resistive load 55 and the third switch 53 are connected in series and form a first branch within the damping component 15. The energy storage device 47 forms a second branch within the damping component 15. The first branch and the second branch are in parallel with each other. The inductor 61 is connected in series before the first and second branch. The damping component 15 is connected between the first switch 13 and the fourth switch 18.

The energy storage device 47 may be charged via the power line 31 through the inductor 61. When the capacitor 47 charges from the power line 31, the inductor 61 forms a DC-buck converter with the capacitor 47. The energy storage device 47 may also discharge onto the power line 31 through the inductor 61. When the capacitor 47 discharges onto the power line 31, the inductor 61 forms a DC-boost converter with the capacitor 47.

A low voltage line 51 is connected between the inductor 61 and the first and second branches of the damping component 15. The low voltage line 51 may be a part of the aircraft electrical network. The low voltage line 51 provides a secondary path for the energy storage device 47 to discharge.

The controller 11 is further connected to the circuit 39 via a third signal line 49. The third signal line 49 connects the controller 11 to the third switch 53 of the damping component 15, such that the controller 11 can control the third switch 53, as discussed further below.

It is to be understood that the parts shown in FIGS. 1 and 2 are disclosed only to assist in understanding the examples of the invention. Additional parts may also be necessary in order to achieve a desired level of functionality, for example resistors, diodes, transistors, inductors, capacitors etc.

During a normal operating mode, wherein the controller 11 does not configure the motor 7 or the circuit 39 into a damping mode, the high-level controller 2 controls the power source 57 to supply DC electrical power to the circuit 39 via the connection terminals 1, 3 by applying a voltage across the connection terminals 1, 3, such that the power line 31 which is connected to the connection terminal 1 is at a higher voltage compared to the neutral line 33. The power line 31 is thus energised and can supply direct current to the circuit 39.

The energised power line 31 and the neutral line 33 are connected to the inverter 5. The high-level controller 2 controls the inverter 5 to convert the received direct current into a 3-phase alternating current (AC), which the inverter 5 outputs as AC electrical power at the 3-phase connection 35. The 3-phase connection 35 transfers the AC electrical power output from the inverter 5 to the permanent magnet motor 7. The motor 7 uses the received 3-phase AC electrical power to energise windings in the motor 7 and thereby produce mechanical torque.

The mechanical torque produced by the motor 7 is transferred by the mechanical coupling 37 to the aircraft component 9 for motion of the aircraft component 9. The high-level controller 2 controls the inverter 5 in such a manner so as to achieve a desired mechanical torque from the motor 7 that causes the aircraft component 9 to move in a direction and for a period of time that is useful.

For example, the mechanical torque may cause a door or a hatch in an aircraft landing gear system to open or close; or cause a control surface, flap, aileron or spoiler to move to a desired position. The torque may cause an aircraft door or evacuation system to be deployed. It is to be understood that these are non-limiting examples of various applications wherein the mechanical torque is used to produce useful motion. As a result of the mechanical torque, the aircraft component 9 moves into a configuration which operates an aircraft system in a desired manner.

As a result of the mechanical torque on the aircraft component 9, the aircraft component 9 gains kinetic energy as it moves. In the normal operating mode, the build-up and dissipation of the kinetic energy can be managed by the high-level controller 2, for example through pre-set operating limits, and techniques such as operating the motor 7 in a braking mode wherein, for example, the kinetic energy is converted into electrical energy and transferred into the power source 57.

Additionally, during the normal operating mode, it may be desired for the motor 7 to not output torque, for example if the aircraft component 9 is a hatch door, and the door has reached a closed position. As such, it is to be understood that it is not necessary for the motor 7 to continuously output mechanical torque, nor is it necessary for the power supply 57 or the power line 31 to remain continuously active during the normal operating mode.

In this manner, during the normal operating mode, the motor 7 is motoring and producing torque which causes useful motion.

Additionally, in the normal operating mode the controller 11 receives electrical energy from the power source 57 via the first connection 27 and the power line 31. The controller 11 monitors the power line 31 by sensing a voltage, a current and/or a power level on the power line 31 to produce the data 19, and then determines a state of the power line 31 based on the data 19. In the normal operating mode, the state of the power line is such that the controller 11 does not configure the circuit 39 into a damping mode.

As a result, the switch 13, which is a normally open switch, does not receive a signal (power) and thus remains open, and therefore in the normal operating mode the damping component 15 remains disconnected from the circuit 39.

Thereafter, a scenario occurs in which there is a need to provide damping to the motor 7, without drawing energy from the power source 57. There are various examples why this may happen, some of which are discussed below.

In a first example, a fault may occur in the aircraft electrical network which causes the power supply 57 to malfunction. In another example, a fault may occur in the high-level controller 2 which prevents the high-level controller 2 from controlling the power source 57 and/or the inverter 5 correctly. In these examples, if the fault occurred whilst the motor 7 is motoring and the aircraft component 9 is moving, it becomes necessary to provide damping to the motor 7 in order to bring the aircraft component 9 or aircraft assembly 29 to rest in a safe manner.

In another example, the motor 7, inverter 5, power line 31 and power source 57 are in an idle or OFF state in the normal operating mode. Subsequently, there may be a gust of wind or other external force which causes the aircraft component 9 to move in an undesired manner and to gain kinetic energy. As a result, there is a need to provide damping to the motor 7 in order to bring the aircraft component 9 or aircraft assembly 29 to rest in a safe manner.

In another example, it may be desired to bring the aircraft component 9 to rest without using energy from the power source 57 (even in the normal operating mode), as this would provide more energy efficient damping. As such, the power line 31 is de-energised and there is a need to provide damping to the motor 7 despite there being no internal or external faults to the aircraft system 41.

In any of the examples, the kinetic energy to be dissipated in the aircraft assembly 29 may be in the permanent magnet motor 7, the mechanical coupling 37 and/or the aircraft component 9.

Each of these non-limiting examples illustrate the beginning of a scenario in which there is a need to provide damping to the motor 7 in order to bring the aircraft component 9 or aircraft assembly 29 to rest, without drawing power from the power source 57 (either due to a fault or due to a desired improvement of damping efficiency). Thus, at the beginning of the scenario the aircraft system 41 is in a state whereby the motor 7 requires damping and the power line 31 is de-energised.

As the scenario continues, the kinetic energy of the aircraft assembly 29 causes the motor 7 to rotate and thereby produce electrical energy in the phases of the motor 7. The electrical energy is transferred to the circuit 39 through the 3-phase connection 35. As a result, the power line 31 becomes re-energised. In this manner, the kinetic energy of the aircraft assembly 29 is transferred to the circuit 39 as electrical energy.

The controller 11 receives the electrical energy from the first connection 27. The first connection 27 is able to supply rectified DC electrical power to the controller 11. In some examples, rectification may not be required. In some examples, AC electrical power may be supplied to the controller 11 directly from the motor 7, which can be rectified internally within the controller 11.

Through the first connection 27, the controller receives electrical energy. The controller 11 is thus powered and capable of providing control signals.

The controller 11 receives a piloting command 28 which instructs the controller 11 to configure the circuit 39 to control the motor 7 in a damping mode. The piloting command 28 can be supplied to the controller 11 from a part of the aircraft or aircraft electrical network, or can be generated internally by the controller 11.

For the piloting command 28 to be generated internally by the controller 11, the controller uses the data 19 to determine whether the voltage on the power line 31 rises above a pre-set threshold. This is possible because when the kinetic energy in the aircraft assembly 29 is transferred to electrical energy in the motor 7, the electrical energy causes the voltage of the power line 31 to rise. Thus, the controller 11 can determine that damping is required in this case.

Additionally, during a normal operating mode in which the power source 57 is able to receive current, the controller 11 can use the data 19 to determine the direction of the current on the power line 31. The controller 11 provides the command 28 if the direction of the current becomes negative, because this indicates that the electrical power in the motor 7 (or voltage) is greater than that supplied by the power source 57, and therefore damping is required.

As a result of receiving or generating the piloting command 28, the controller 11 configures the circuit 39 into a damping mode to provide damping for the motor 7.

In the damping mode, the high-level controller 2 is turned off, or is off as a result of the fault, such that the high-level controller 2 does not interfere with the operation of the controller 11.

FIG. 1 shows a first damping component configuration, wherein a resistive load 15 is used as the damping component 15. As discussed above the controller 11 receives electrical energy from the motor 7. The controller 11 uses the electrical energy to send a first signal via a first signal line 23 to the first switch 13. Because the first switch 13 is a normally open switch, by providing the first signal the first switch 13 is configured into a closed configuration. In the closed configuration, the first switch 13 connects the resistive load 15 to the circuit 39.

The first switch 13 connects the resistive load 15 to the power line 31. As a result, electrical energy is transferred from the motor 7 to the resistive load 15. The resistive load 15 converts the received electrical energy into thermal energy which is dissipated by a heat sink or other suitable method or apparatus capable of safely dissipating thermal energy. In this manner, energy is transferred from the motor 7 to the resistive load 15 and then dissipated, and as a result damping is provided to the motor 7.

During the damping mode, the voltage, current and power on the power line 31 will increase if the rotational speed of the motor 7 increases, and the voltage, current and power on the power line 31 will decrease if the rotational speed of the motor 7 decreases.

There may therefore be a need to provide a greater amount of damping when the power level of the power line 31 is at a maximum, and provide a lower level of damping when the power on the power line 31 is less than the maximum such that the aircraft component 9 or aircraft assembly 29 can be brought to rest in a safe manner (without abrupt movement).

In order to provide a variable level of damping, the brake controller 21 implements a braking algorithm which includes providing the first signal as a Pulse Width Modulated (PWM) signal. The PWM signal has parameters of a pulse width, a duty cycle and a frequency. The first switch 13 is in the closed configuration for a period of time corresponding to the pulse width or duty cycle of the PWM signal, such that the power transferred to the resistive load 15 increases as the pulse width or duty cycle of the PWM signal increases.

The braking algorithm configures the PWM signal by increasing the pulse width of the PWM signal as the voltage, current and/or power level on the power line 31 increases. The braking algorithm configures the PWM signal by decreasing the pulse width of the PWM signal as the voltage, current and/or power level on the power line decreases.

The controller 11 can thus use the data 19 to determine the state of the power line 31, and determine an appropriate level of damping (i.e. energy transfer) that is required for the motor 7 in order to bring the aircraft component 9 or aircraft assembly 29 to rest in a safe manner. The brake controller 21 uses this information to determine the PWM parameters required to achieve the appropriate level of damping. In this manner, a variable level of damping is provided to the motor 7, wherein the damping also dynamically responds in accordance with the requirements of the motor 7.

The second switch 17 is a normally open switch. Configuring the second switch 17 into a closed configuration can be done by either the controller 11 or the external controller 45 providing the second switch 17 with a second signal along the second line 25. The second signal thus configures the second switch 17 into a closed configuration, which connects the resistive load 15 to the neutral line 33, and thereby allows electrical power to flow through the resistive load 15.

In the normal operating mode where damping is not required, the second switch 17 remains in an open configuration because it does not receive the second signal. In the event that the first switch 13 malfunctions during the normal operating mode, such that the first switch 13 becomes stuck in a closed configuration, because the second switch 17 is in the open configuration the resistive load 15 remains disconnected from the circuit 39. This prevents the resistive load 15 interfering with the normal operation of the motor 7 in the event that the first switch 13 malfunctions, which improves the safety and reliability of the system.

In the damping mode, the second switch 17 is in a closed configuration because it receives the second signal from the controller 11 or the external controller 45. In the event that the first switch 13 malfunctions and becomes stuck in a closed configuration, and it is desired to stop the damping, the second signal provided to the second switch 17 can be stopped at any time, which will cause the second switch 17 to disconnect the resistive load 15 from the circuit 39, thereby prevent the resistive load 15 providing damping to the circuit 39.

In this manner, the second switch 17 is a failsafe switch, which can be utilised by the aircraft electrical network or aircraft system 41 to further control operation of the damping component 15.

In summary, in the damping mode with the damping component arranged as shown in FIG. 1, the controller 11 receives electrical energy from the motor 7, which is a result of kinetic energy in the aircraft assembly 29. The controller 11 uses the received electrical energy to provide the first (PWM) signal to the first switch 13 and thereby connect and disconnect the resistive load 15 to the power line 39 in a variable manner. The controller 11 also provides the second signal to the second switch 17. When the resistive load 15 is connected to the power line 39, electrical energy is transferred from the motor 7 to the resistive load 15 and damping is provided to the motor 7. The controller 11 continuously produces data 19 by monitoring the power line 31, and uses the data 19 to determine a braking algorithm which determines the pulse width of the PWM signal. Variable damping is thus provided to the motor 7, and the aircraft component 9 or aircraft assembly 29 is brought to rest in a safe and controlled manner. During the damping mode, there is no external power or control provided to the system.

FIG. 2 shows a similar example as discussed in relation to FIG. 1, with like numerals denoting similar features and functionality. However, in FIG. 2 the damping component 15 comprises the energy storage device 47, the inductor 61, and the resistive load 55. The third switch 53 and low voltage line 51 are also provided.

In the example of FIG. 2, it is desired that the electrical energy transferred from the motor 7 during the damping mode is stored and reused. The energy storage device 47, which in this example is a capacitor 47, is thus provided as the main target for the energy transfer. As such, when the controller 11 or the brake controller 21 provides the first signal to the first switch 13, the capacitor 47 is connected to the power line 31, which allows the electrical energy from the motor 7 to transfer via the power line 31 and the inductor 61 to the capacitor 47. As a result, the capacitor 47 charges.

The fourth switch 18 is controlled by the controller 11 via the fourth signal line 24. The function of the fourth switch 18 is to act as a synchronous rectifier operating in a complimentary manner to the first switch 13, such that the first switch 13 and the fourth switch 18 form a half bridge.

The capacitor 47 charges in a characteristic manner, wherein the rate of charging will decrease as the capacitor 47 reaches its maximum capacity. Because the rate of charging the capacitor 47 will decrease, the capacity for the capacitor 47 to provide electrical energy transfer (damping) to the motor 7 will also decrease.

In order to ensure the desired level of damping is provided as discussed above, the resistive load 55 and third switch 53 are used in conjunction with the capacitor 47. The resistive load 55 functions in the same manner as the resistive load 15 in FIG. 1.

The third signal may not be configured as a PWM signal, because providing the variable control aspect of the damping component may already achieved by the PWM of the first signal to the first switch 13.

The third switch 53 is activated once a charge threshold on the capacitor 47 has been met. The charge threshold is set at a level after which the capacitor 47 may not provide adequate power transfer. Thus, in the first instance energy is transferred from the motor 7 to the capacitor 47. If the capacitor 47 reaches the charge threshold, the resistive load 55 is connected to the power line 31, by providing the third signal to the third switch 53, to provide further energy transfer and thus damping.

In this manner, electrical energy is transferred from the motor 7 and stored, and damping is provided to the motor 7 in order to bring the aircraft component 9 or aircraft assembly 29 to rest.

Once the aircraft system 41 resets, it is necessary to discharge the capacitor 47 in order to ensure the capacitor 47 is able to provide maximum energy storage capacity for any future damping modes.

Therefore, once the damping mode has ended, during a subsequent normal operating mode, the capacitor 47 is discharged by the first switch 13 remaining in a closed configuration, such that the stored energy in the capacitor 47 is transferred to the power line 31 via the inductor 61 and consumed by the inverter 5, motor 7 etc. Alternatively or additionally, the capacitor 47 can be discharged directly onto the low voltage line 51. The low voltage line 51 can be used to provide electrical energy to low voltage functions within the aircraft system 41.

As a result, by transferring, storing and then reusing the electrical energy in the capacitor 47, the aircraft system 41 or aircraft electrical network is able to operate in a more efficient manner.

As discussed above, it is to be understood that the parts shown of FIGS. 1 and 2 are disclosed only to assist in understanding the examples of the invention. As a result, in particular, inductors and capacitors required to achieve the functionality of the inverter 5 are not shown.

Various aspects of the apparatus disclosed in the various embodiments may be used alone, in combination, or in a variety of arrangements not specifically discussed in the embodiments described in the foregoing and this disclosure is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A controller for an aircraft assembly that includes a permanent magnet motor; the controller configured to:
- control the permanent magnet motor according to a damping mode;
- wherein in the damping mode the controller;
- receives electrical energy from the permanent magnet motor, wherein the electrical energy is produced as a result of kinetic energy in the aircraft assembly; and
- uses the electrical energy to send a first signal to control a transfer of electrical energy from the permanent magnet motor to a damping component to provide damping to the permanent magnet motor;
- wherein the damping component comprises an energy storage device; wherein providing the first signal causes the transferred energy to be stored in the energy storage device;
- wherein the damping component further comprises a resistive load and a third switch;
- wherein the controller is further configured to:
- in response to the energy storage device reaching a charge threshold, provide a third signal to the third switch, wherein the third signal configures the third switch to connect the resistive load to the circuit, such that energy can be transferred to and then dissipated in the resistive load.

2. The controller of claim 1, wherein the controller is further configured to:
- monitor a power line used for powering the motor by sensing a voltage, a current and/or a power level on the power line to produce data; and
- determine a state of the power line based on the data.

3. The controller of claim 2, wherein the permanent magnet motor receives electrical power from a circuit;
- wherein in the damping mode the controller is further configured to:
- provides the first signal to a first switch in order to connect or disconnect a part of the circuit.

4. The controller of claim 3, wherein the first switch is a Normally Open switch; wherein the first signal configures the first switch into a closed configuration which connects the damping component to the circuit, such that electrical energy can be transferred from the permanent magnet motor to the damping component.

5. The controller of claim 4, wherein the first signal is a Pulse Width Modulated signal, and the first switch is in the closed configuration for a period of time corresponding to a parameter of the PWM signal, such that the power transferred to the damping component is proportional to the parameter of the PWM signal.

6. The controller of claim 5, further comprising a brake controller;
- wherein the brake controller is configured to implement a braking algorithm;
- wherein the braking algorithm configures one or more of the parameters of the PWM signal based on the data.

7. The controller of claim 6, wherein the braking algorithm configures one or more of the parameters of the PWM signal by:
- increasing a pulse width or a duty cycle of the PWM signal as the voltage, current and/or power level on the power line increases; and
- decreasing a pulse width or a duty cycle of the PWM signal as the voltage, current and/or power level on the power line decreases.

8. The controller of claim 1, wherein the damping component comprises a resistive load; wherein providing the first signal causes the transferred energy to be dissipated in the resistive load.

9. A DC-AC inverter circuit for damping a permanent magnet motor, the circuit comprising:
- a controller according to claim 1 for controlling the circuit to provide the damping.

10. An aircraft system comprising:
- the circuit of claim 9;
- the permanent magnet motor; and
- a power source for powering the permanent magnet motor.

11. The aircraft system of claim 10, wherein the permanent magnet motor is for providing actuation to: an aircraft landing gear system; a control surface; a flap; a spoiler; an aircraft door or evacuation system.

12. A method for controlling an aircraft assembly with the controller of claim 1, the method comprising:
- controlling the permanent magnet motor according to a damping mode;

wherein the damping mode comprises:

powering a controller by drawing electrical energy from the permanent magnet motor, wherein the electrical energy is produced as a result of kinetic energy in the aircraft assembly; and using the electrical energy to send a first signal to control a transfer of electrical energy from the permanent magnet motor to a damping component to provide damping to the permanent magnet motor, monitor a power line used for powering the motor by sensing a voltage, a current and/or a power level on the power line to produce data; and determine a state of the power line based on the data.

13. The method of claim 12, further comprising:

monitoring a power line used for powering the motor by sensing a voltage, a current and/or a power level on the power line to produce data; and determining a state of the power line based on the data.

14. The method of claim 13, wherein the permanent magnet motor receives electrical power from a circuit;

wherein in the damping mode the method further includes providing the first signal to a first switch in order to connect or disconnect a part of the circuit.

15. The method of claim 14, wherein the first switch is a Normally Open switch; wherein the first signal configures the first switch into a closed configuration which connects the damping component to the circuit, such that electrical energy can be transferred from the permanent magnet motor to the damping component.

16. The method of claim 15, wherein the first signal is a Pulse Width Modulated signal, and the first switch is in the closed configuration for a period of time corresponding to a parameter of the PWM signal, such that the power transferred to the damping component is proportional to the parameter of the PWM signal.

17. The method of claim 16, wherein the controller further comprises a brake controller;

wherein the brake controller is configured to implement a braking algorithm;

wherein the braking algorithm configures one or more of the parameters of the PWM signal based on the data.

18. A controller for an aircraft assembly that includes a permanent magnet motor; the controller configured to:

control the permanent magnet motor according to a damping mode;

wherein in the damping mode the controller;

receives electrical energy from the permanent magnet motor, wherein the electrical energy is produced as a result of kinetic energy in the aircraft assembly; and uses the electrical energy to send a first signal to control a transfer of electrical energy from the permanent magnet motor to a damping component to provide damping to the permanent magnet motor, wherein the controller is further configured to:

monitor a power line used for powering the motor by sensing a voltage, a current and/or a power level on the power line to produce data; and determine a state of the power line based on the data;

wherein the permanent magnet motor receives electrical power from a circuit;

wherein in the damping mode the controller is further configured to:

provide the first signal to a first switch in order to connect or disconnect a part of the circuit, wherein the first switch is a Normally Open switch; wherein the first signal configures the first switch into a closed configuration which connects the damping component to the circuit, such that electrical energy can be transferred from the permanent magnet motor to the damping component, wherein the first signal is a Pulse Width Modulated signal, and the first switch is in the closed configuration for a period of time corresponding to a parameter of the PWM signal, such that the power transferred to the damping component is proportional to the parameter of the PWM signal, the controller further comprising a brake controller, wherein the brake controller is configured to implement a braking algorithm;

wherein the braking algorithm configures one or more of the parameters of the PWM signal based on the data;

wherein the braking algorithm configures one or more of the parameters of the PWM signal by:

increasing a pulse width or a duty cycle of the PWM signal as the voltage, current and/or power level on the power line increases; and decreasing a pulse width or a duty cycle of the PWM signal as the voltage, current and/or power level on the power line decreases, wherein the controller is further configured to:

provide a second signal to a second switch, wherein the second signal configures the second switch to connect or disconnect the damping component from the circuit.

* * * * *